June 7, 1949.  J. A. BARRAKET  2,472,394
LOCKING DEVICE
Filed Sept. 17, 1947

INVENTOR.
JACOB A. BARRAKET
BY
Saulsbury, Russell & Squire
ATTORNEYS

Patented June 7, 1949

2,472,394

UNITED STATES PATENT OFFICE 2,472,394

LOCKING DEVICE

Jacob A. Barraket, Brooklyn, N. Y.

Application September 17, 1947, Serial No. 774,466

1 Claim. (Cl. 151—32)

The present invention relates to locking devices for screws and bolts and more particularly to locking devices which are suitable for preventing the screws of eyeglasses from becoming loosened.

An object of the invention is to provide a locking device for a screw bolt or other threaded fastening device which is also suitable for use as wrench for tightening the screw.

A further object of the invention is to provide a locking device which will hold the screw firmly and positively without reliance on friction, adhesion, or similar phenomena.

A feature of the invention resides in the simplicity of its construction and the permanency of its locking action. In a pair of eyeglasses, for example, certain styles of rimless frames ordinarily use four small screws to attach the lenses to the frames. These screws cannot be overtightened without danger of cracking the lenses. With the degree of tightness which is desirable to avoid the creation of undue stresses in the lenses, there is usually not a sufficient amount of friction to hold the screws securely and prevent them from working loose. Accordingly it is a further object of the invention to maintain the correct amount of tightness in screws of this character and to hold the lenses permanently and securely without undue stress and to prevent this tightness from changing in the course of use.

Other and further objects will become apparent upon reading the following specification together with the accompanying drawing forming a part thereof.

Referring to the drawings

Figure 4:
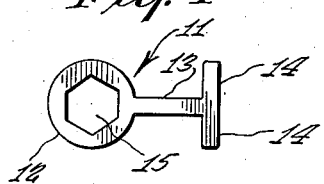
Fig. 4 is a plan view of the embodiment of Fig. 1, before being bent into the final shape shown in Fig. 1.

Referring to Fig. 4, a flat member of thin sheet of metal or other suitable material designated generally as 11 is shown with a rounded portion 12, a shank 13, and a pair of outwardly extending transverse ears 14. A hexagonal hole 15 in rounded portion 12 is shaped for engagement with a hexagonalheaded screw 16 which is also shown provided with a screwdriver slot 17.

Figure 1:
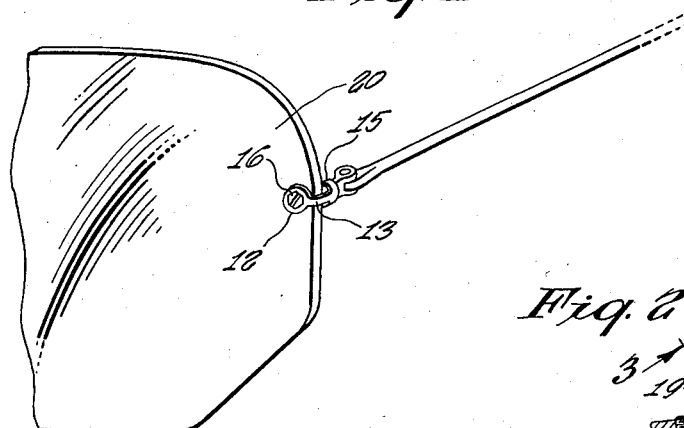
Fig. 1 is a fragmentary perspective view of a pair of eyeglasses illustrating an embodiment of the invention.
Figure 2:
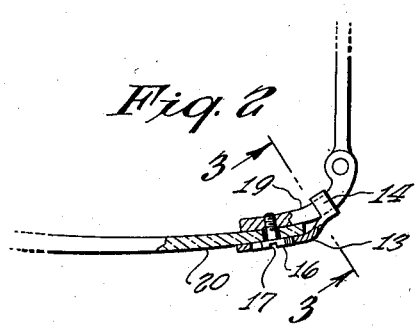
Fig. 2 is a fragmentary plan sectional view of the embodiment of Fig. 1.
Figure 3:
Fig. 3 is a sectional view taken along the line 3—3 of Fig. 2, looking in the direction of the arrows.

The screw 16 is tightened into the threaded hole 18 of lens supporting member 19 either by means of the screwdriver and screwdriver slot 17 or by using the hole 15 of the device 11 in the same way as the usual hole of a closed end wrench until the desired degree of tightness has been achieved. Then, using pliers or some other suitable tool, the shank portion 13 is bent so that rounded portion 12 will lie flat against the lens 20 shown in Fig. 1 and the ears 14 are positioned in proximity to lens supporting member 19. The ears 14 are then bent to encircle lens supporting member 19 gripping it tightly thus holding the device 11 securely in place.

Rounded portion 12 is thus held fixedly in position with hole 15 engaging the hexagonal head of screw 16. Screw 16 is thereby permanently prevented from becoming loosened until the device 11 is bent to disengage hole 15 from the head of screw 16.

Figure 5:
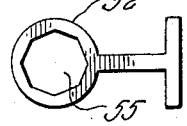
Fig. 5 is a plan view similar to Fig. 4 of a modified form of the invention.

In Fig. 5, the device 11 is shown as being provided with an octagonal hole 55 in rounded portion 52 instead of the hexagonal hole 15 shown in Fig. 4. The use of the octagonal hole permits screw 16 to be locked in any one of eight angular positions instead of six thereby permitting a more accurate adjustment of the degree of tightness.

Figure 6:
Fig. 6 is perspective view of another modified form of the invention.

In Fig. 6, a still greater number of angular locking positions are provided by the use of a fluted head 66 for screw 67 which is shaped for engagement with a correspondingly fluted hole 65 in rounded portion 62. The modified form of the invention shown in Fig. 6 is otherwise the same as that shown in Figs. 1 to 4.

Figure 7:
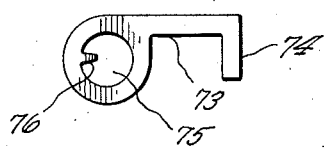
Figs. 7 and 8 are plan views of further modified forms of the invention, similar to Fig. 4.

Fig. 7 illustrates a further modification. A circular hole 75 is provided with an inwardly extending projection 76 adapted for engagement with a suitable screw such as the fluted head screw 66—67. Shank 73 is shown provided with a single ear 74 which may be of any desired length instead of the two ears 14 of Fig. 4. The single ear may be used when such an arrangement makes the installation of the device more convenient, and the single ear may be obtained by cutting off one of the ears from a device in accordance with Fig. 4. It is also possible to adjust the length of the transverse ears 14 of Fig. 4 by similarly cutting them in order to accommodate lens supporting members of varying dimensions.

Figure 8:
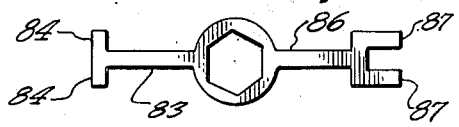

Fig. 8 illustrates a further modification of the invention which is suitable for other applications. Two shank portions 83 and 86 are provided. Shank portion 83 is provided with a pair of transverse ears 84 as in the case of the forms previously described. Shank 86 is provided with a bifurcated end comprising the two leg portions 87. The leg portions 87 may be bent to interlock with the extending ears 84 when the device is applied to a structure where the two shank portions may effectively be bent to encircle the structure. Either of the shank portions may be cut off, if desired. This will be desirable in certain instances where the bifurcated legs 87 are most suitable for engagement with a portion of the main structure without the use of the transverse ears 84.

Figure 9:
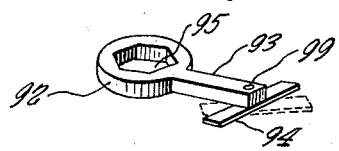
Fig. 9 is perspective view of still another modified form of the invention.

Fig. 9 shows a further modification of the invention suitable for use where the screw is to be given a considerable degree of tightness. To provide greater rigidity and strength, rounded portion 92 and shank portion 93 are of relatively heavy metal which would not be suitable for bending to lock the device in position. The transverse ears are provided by a separate bendable member 94 which is secured by a rivet 99. If desired, rivet 99 may be sufficiently loose to permit it to be rotated throughout a range of angular positions in order to facilitate bending to the desired shape. The heavier wrench construction shown in Fig. 9 will be useful in machinery subject to considerable vibration such as aircraft engines.

Having thus described my invention, what I desire to secure by Letters Patent is set forth in the appended claim.

I claim:

In a device of the class described, a relatively flat sheet of permanently deformable material having an enlarged portion apertured to grip the head of a screw, shank portions extending respectively from the enlarged portion and bendable rearwardly therefrom, one of said shank portions having on its free end a pair of transverse ears, the other shank portion having on its free end two horizontally extending leg portions and being of bifurcated configuration, said leg portions being adapted to be bent to interlock with the extending ears as the shank portions are bent rearwardly for engagement with a structure containing the screw.

JACOB A. BARRAKET.

REFERENCES CITED

The following references are of record in the file of this patent:

UNITED STATES PATENTS

| Number | Name | Date |
|---|---|---|
| 350,387 | Partridge | Oct. 5, 1886 |
| 637,199 | Fennell | Nov. 14, 1899 |
| 670,988 | Griffith | Apr. 2, 1901 |
| 1,322,624 | Rosenblatt | Nov. 25, 1919 |
| 1,523,551 | Mann | Jan. 20, 1925 |
| 1,598,495 | Nelson | Aug. 31, 1926 |
| 2,154,655 | Bahan | Apr. 18, 1939 |
| 2,390,838 | Johnson | Dec. 11, 1945 |